United States Patent [19]

Fujimura et al.

[11] Patent Number: 4,533,949
[45] Date of Patent: Aug. 6, 1985

[54] SUBSCRIPTION TELEVISION SYSTEM

[75] Inventors: Yasushi Fujimura, Musashino; Takashi Okada, Yokohama; Kazuo Yamagiwa, Tokyo, all of Japan

[73] Assignee: Sony Corporation, Tokyo, Japan

[21] Appl. No.: 415,836

[22] Filed: Sep. 8, 1982

[30] Foreign Application Priority Data

Sep. 10, 1981 [JP] Japan .............................. 56-142836
Sep. 10, 1981 [JP] Japan .............................. 56-142837

[51] Int. Cl.³ .......................... H04N 7/16; H04K 1/04
[52] U.S. Cl. .................................. 358/122; 358/119; 360/27
[58] Field of Search ............... 358/114, 117, 118, 122, 358/123, 119, 121; 360/27

[56] References Cited

U.S. PATENT DOCUMENTS

| 2,857,455 | 10/1958 | Jolliffe | 358/123 |
| 4,225,884 | 9/1980 | Block et al. | 358/117 |
| 4,250,524 | 2/1981 | Tomizawa | 358/122 |
| 4,354,201 | 10/1982 | Sechet et al. | 358/122 |
| 4,389,671 | 6/1983 | Posner et al. | 358/121 |
| 4,403,252 | 9/1983 | Ragan et al. | 358/118 |
| 4,405,942 | 9/1983 | Block et al. | 358/119 |
| 4,430,669 | 2/1984 | Cheung | 358/123 |

Primary Examiner—S. C. Buczinski
Attorney, Agent, or Firm—Lewis H. Eslinger; Alvin Sinderbrand

[57] ABSTRACT

In a subscription television system, only a video signal for a specific program is scrambled in a television signal in accordance with a predetermined scrambling mode. A key signal, used for unscrambling the scrambled video signal, is generated in response to the scrambling mode. The key signal is transmitted after the scrambled program.

19 Claims, 20 Drawing Figures

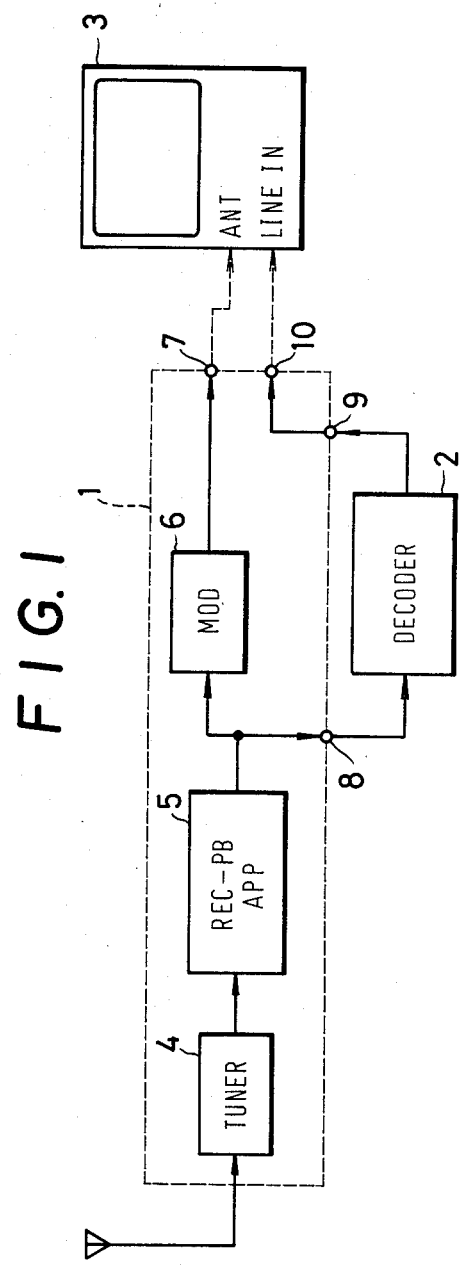
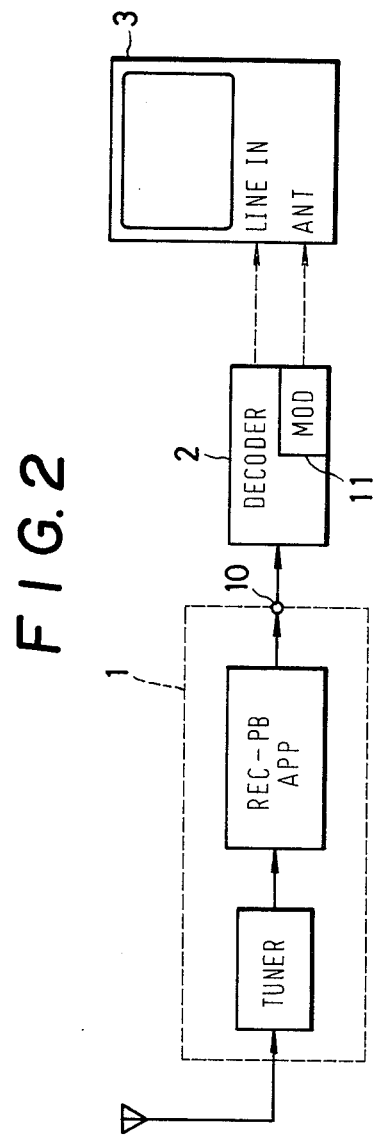

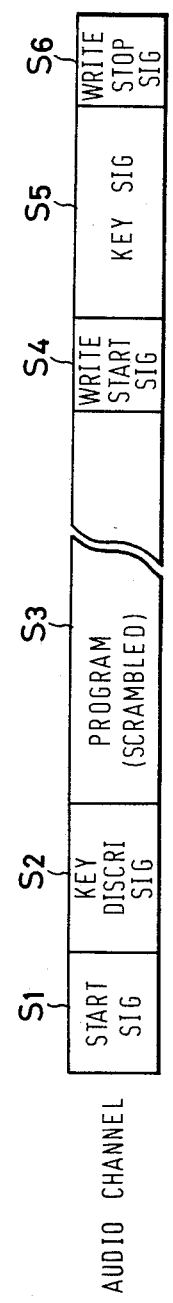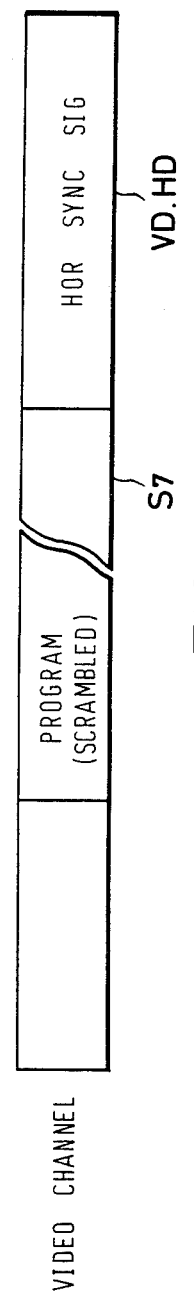

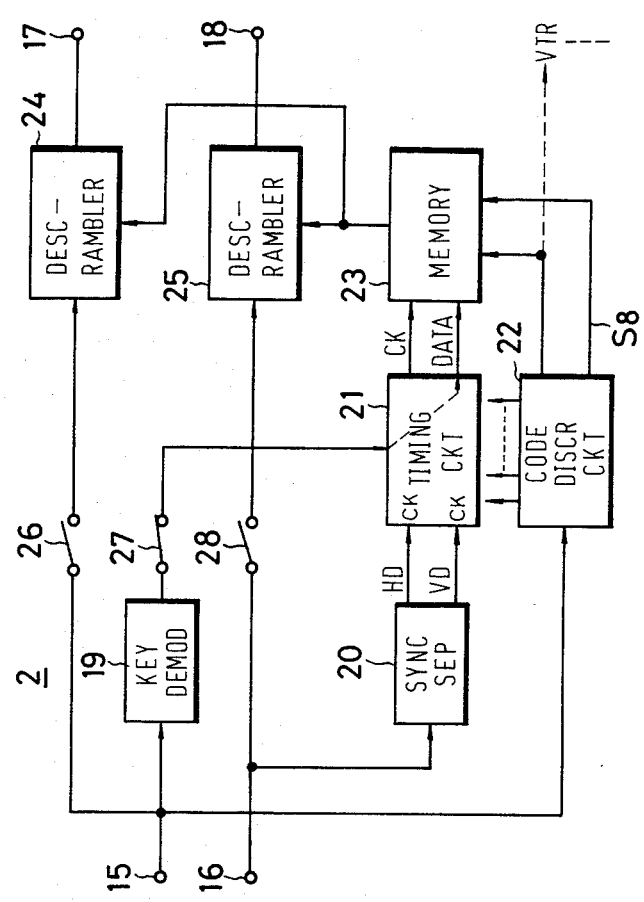
F I G. 4
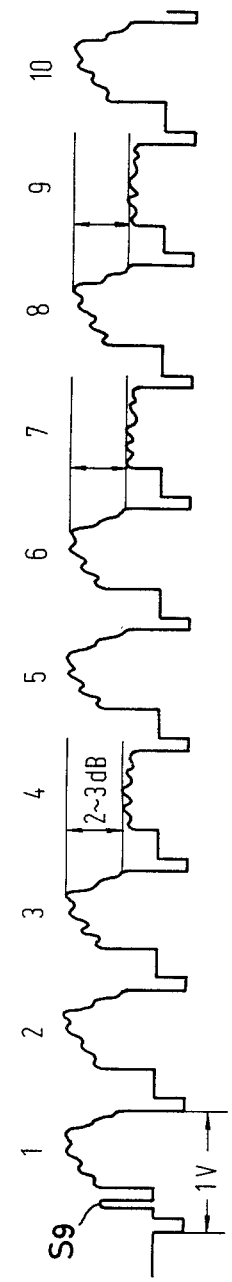
F I G. 5

FIG. 8
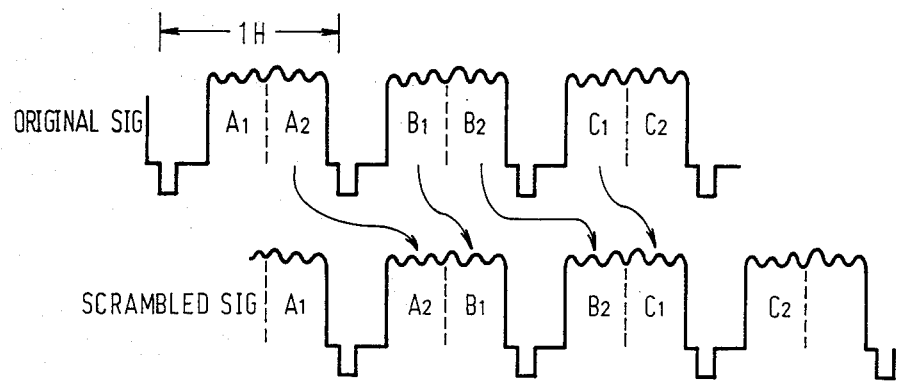
FIG. 9A NORMAL
FIG. 9B SCRAMBLED
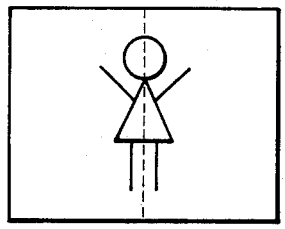
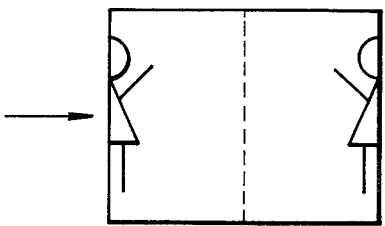
FIG. 10
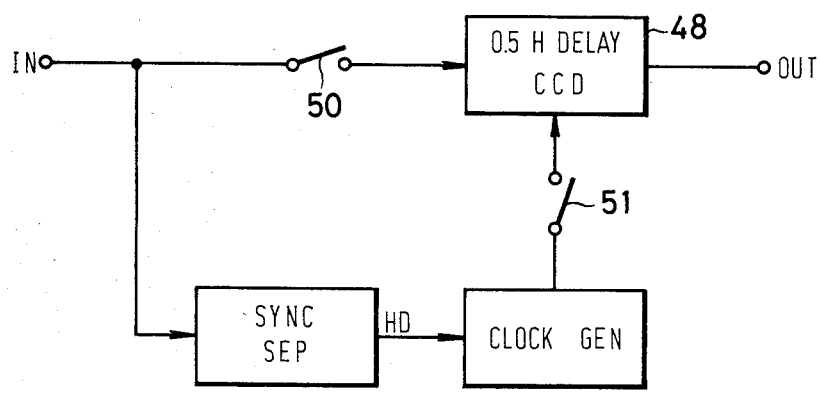

NORMAL

SCRAMBLED

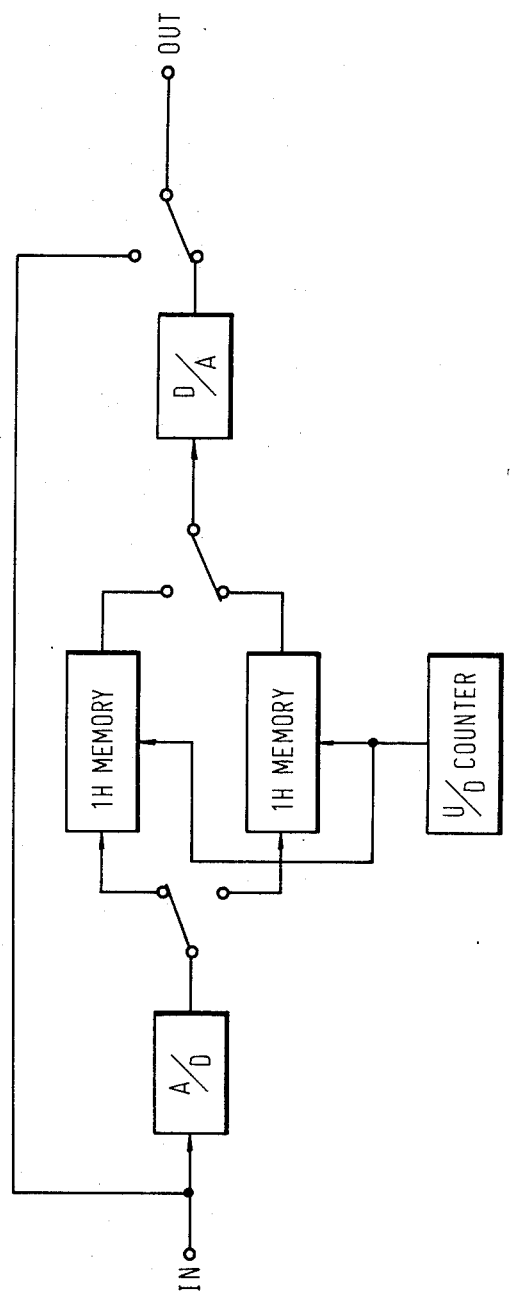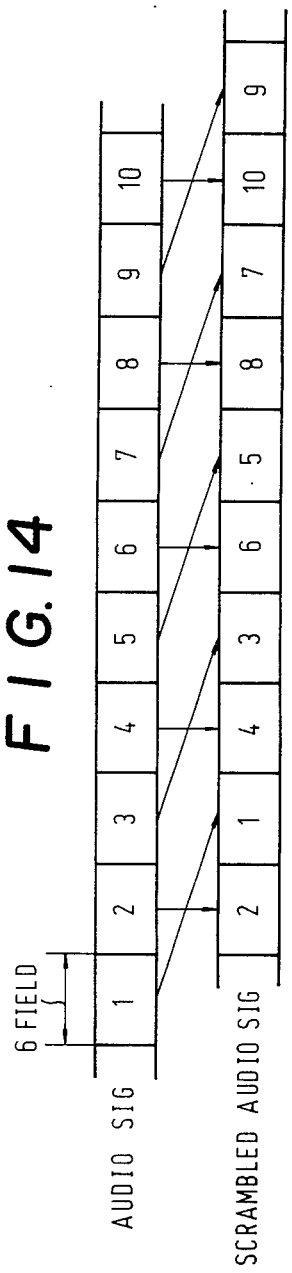

4,533,949

SUBSCRIPTION TELEVISION SYSTEM

CROSSREFERENCE OF THE APPLICATION

This application corresponds to Disclosure Document No. 102866 filed Sept. 17, 1981.

BACKGROUND OF THE INVENTION

1. Field of the Invention

This invention relates to a subscription television system, and more particularly, to a system in which television signals are scrambled for broadcasting, with the scrambled signals being transmitted in a form suitable for recording by means of a recording and playback apparatus such as a video tape recorder.

2. Description of the Prior Art

Recently, a subscription television system has been proposed in which a specific program is transmitted by a broadcasting station after being scrambled. The transmitted program can be received only by the subscribers having special decoders which are supplied based on a contract with the broadcasting station. A small scale experimental broadcast according to such a system is being tried in one area. In the scrambled broadcast, the television signals comprising the specific program are scrambled by changing the level thereof over an optional period or by replacing the order of the signals and then broadcasting the changed signals from the broadcasting station. Accordingly, even if the scrambled television signals are received by an ordinary or conventional receiver, correct pictures and sound can not be reproduced. The normal pictures and sound can be received only by the subscribers who have a contract with the broadcasting station and accordingly have a decoder which can descramble the signals scrambled at the station.

In such a system, the following conditions must be met;

(1) A simultaneous descrambling can not be made while the program is being received in the scrambled broadcasting.
In short, the reception of a normal unscrambled program is not possible in real time.

(2) The program in the scrambled broadcasting must be recorded once in a video tape recorder (VTR) before reproduction.

(3) For the tape in which the program of the scrambled broadcast is recorded, a VTR with a decoder must be used to reproduce the program correctly.

(4) Any type of VTR can be used.

(5) The modification to a conventional VTR, i.e., the addition of a decoder, must minimized.

(6) The scrambled broadcast is aired ordinary idle time, such as at midnight, without, utilizing an ordinary broadcasting time period.

Accordingly, it is one object of the present invention to provide an improved subscription television system in which a scrambled television signal is transmitted by way of a broadcasting wave.

It is another object of the present invention to provide a system in which a broadcast scrambled television signal is temporarily recorded, and, upon reproduction, the scrambled television signal is unscrambled for display on a conventional TV screen.

In accordance with an aspect of this invention, a subscription television system comprises means for scrambling at least one of the video signal and the audio signal of a specific program in accordance with a predetermined scrambling mode, means for generating a control signal in response to the scrambling mode, with the control signal including a key signal which is used for unscrambling the signal scrambled in the scrambling means, and means for transmitting key signal after the termination of the specific program.

The above, and other aspects, features, and advantages of the present invention will be apparent from the following detailed description of illustrative embodiments thereof which is to be read in conjunction with the accompanying drawings.

BRIEF DESCRIPTION OF THE DRAWINGS

FIGS. 1 and 2 are block diagrams illustrating receiving components of subscription television system in accord with the present invention;

FIGS. 3A and 3B illustrate the order of transmission of the audio and video components, respectively, of a subscription television signal according to an embodiment of the present invention;

FIG. 4 is a block diagram illustrates an embodiment of the decoder in FIG. 1;

FIG. 5 is a graph depicting a scrambled television video signal;

FIG. 8 is a graph depicting an alternate scrambled television video signal;

FIGS. 9A and 9B are schematic representations of a picture on a TV screen produced in response to an original or normal unscrambled signal and in response to a signal scrambled as shown on FIG. 8, respectively;

FIG. 10 is a block diagram of a scramble circuit which performs the scrambling operation of FIG. 8;

FIGS. 12 and 13 are block diagrams of other embodiments of scrambling circuits;

FIG. 14 is a graph which is useful for explaining a scrambling operation of the audio signal portion of a television signal;

DESCRIPTION OF THE PREFERRED EMBODIMENTS

Figure 6:
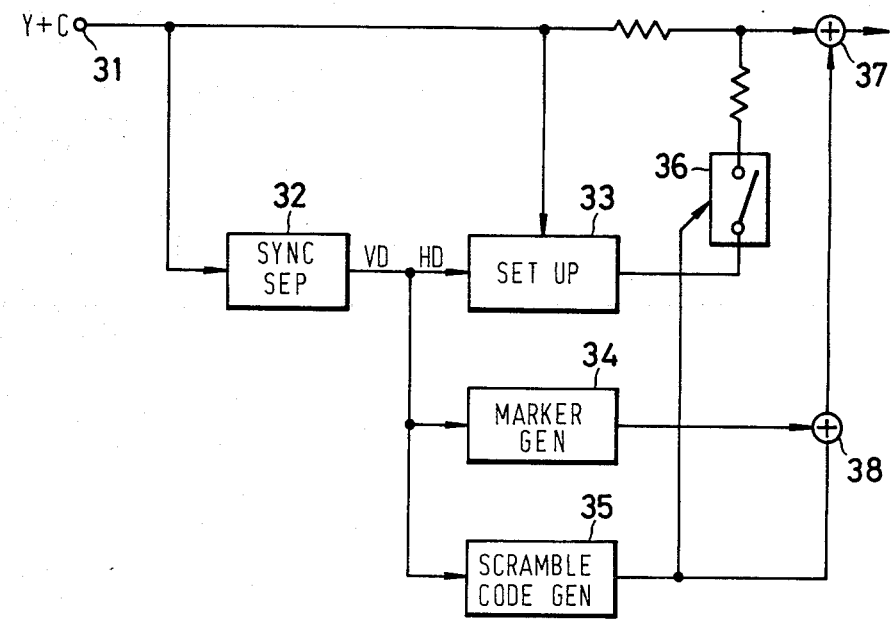
FIG. 6 is a block diagram of an embodiment of scrambling circuit in accord with the present invention for performing the scrambling operation of FIG. 5.

Reference is first directed to the block diagrams of FIGS. 1 and 2 which illustrate a typical connection of a VTR 1, a decoder 2 and a receiver 3 in accordance with the present invention.

In FIG. 1, a conventional helical scan type VTR is used as the VTR 1. The VTR comprises a tuner 4, a recording and playback apparatus 5 including a mechanism for recording and playback as well as the associate circuit system, a modulator 6 which modulates a regenerative video signal and an audio signal in a normal broadcast to an idle channel frequency. The modulated signals are applied to an antenna terminal (ANT) of the reciever 3 from an output terminal 7. On the other hand, the scrambled video and audio signals from the recording and playback apparatys 5 are applied to the decoder 2 via a terminal 8 and descrambled therein to obtain normal television signals. The normal television signals pass again through the VTR via an input terminal 9 and an output terminal 10 thereof and are applied to a LINE-IN terminal of the receiver 3.

Referring now to FIG. 2 wherein a modulator 11 is included in the decoder 2, the descrambled signals are converted into a signal having an idle channel frequency and applied to the antenna terminal (ANT). It is to be appreciated that, when the descrambled signals are not modulated, they are applied to the LINE-IN terminal.

FIG. 3, indicates the contents of the signal to be transmitted when a certain program is put on the air through a scrambled broadcast.

In the audio channel, a start signal $S_1$ is added representing the beginning of the program of scrambled broadcast, and a key discrimination signal $S_2$ used for identifying the type of key signal $S_5$ included to be described more fully hereinbelow, as shown in the drawing. Next, a scrambled audio signal $S_3$ for the program transmission is recorded. When the program is completed, a write start signal $S_4$ for writing the key signal $S_5$ into a memory (not shown) is added, and then the key signal $S_5$ for descrambling the scrambled signals $S_3$ ($S_7$) is added. Finally, a write stop signal $S_6$ is added. In the video channel, subsequent to the scrambled program video signal $S_7$ corresponding to the signal $S_3$ is the audio channel, vertical sync signal VD and a horizontal sync signal HD are added to the portions corresponding to that of the signals $S_4$–$S_6$ in the audio channel.

For the signals $S_1$, $S_2$, $S_4$, $S_5$ and $S_6$ in the audio channel excluding the program signal $S_3$, a binary code signal of 32 bits due to a NRZ modulation system, for example, is utilized. This binary code signal is modulated in FSK mode and then superimposed on the television signals. In this case, "1" and "0" in the binary code are modulated into 1000Hz and 600Hz, for example, respectively.

When the broadcasting is performed at midnight, the VTR 1, decoder 2 and receiver 3 are actuated by detecting the start signal $S_1$.

For the above explanation, the key signal $S_5$ is determined as follows.

Assume that a certain program is to be scrambled by changing the level of the signal in one field unit. In this case, the signal level of an optional field period in an optional predetermined period of time of the video signal, for example, is lowered by a required amount, and this procedure is repeated every predetermined period. For example, assuming that the predetermined period is divided into five fields and only the first and third fields of the five fields are lowered in level, the descrambling operation at the receiving side is done by raising the gain of an amplifier at the intervals corresponding to the first and third fields for every five fields. If the key in the case where the gain is raised is assumed to be "1", the key signal can be represented by a code pattern of "10100". The audio signal is scrambled and descrambled in a similar fashion.

In the illustrated embodiments, the descrambling operation after completion of the recording of the program in the VTR (1) is accomplished by writing the key signal $S_5$ into the memory included in the decoder 2, and verifying the key signal $S_5$ with the reproduced signal while always reading the key signal $S_5$ at the time of playback. The code of the key signal $S_5$ may be changed for every program or, every time, day, week or month so as to keep the contents thereof confidential to persons other than subscribers. For this reason, when a large number of programs are recorded, various kinds of key signals an be written in the memory. In order to permit discrimination of the key code used to descramble the desired program at the time of playback, the key discrimination signal $S_2$ is added to the transmission ahead of the program.

As previously stated, in the illustrated embodiment, the key signal $S_5$ is added at the end of the program. For this reason, the scrambled program can not be watched in real time. The reproduction of the correct program is thus possible only after having been recorded on the tape with the VTR 1. On the other hand, if the key signal $S_5$ is not recorded on the tape, the descrambling of the copy tape, if any, is not possible because there is no key signal. In addition, even if the key signal is recorded on a tape, the descrambling operation is not possible without a decoder. The horizontal and vertical sync signals HD and VD are added in order to obtain clock pulses used in writing the key signals.

Next, the decoder 2 of FIGS. 1 and 2 will be explained in detail in conjunction with the embodiment of FIG. 4.

The decoder 2 includes, as shown in the drawing, an audio signal input terminal 15, a video signal input terminal 16, an audio signal output terminal 17, a video signal output terminal 18, a key signal demodulator 19, a sync separation circuit 20, a timing circuit 21, a coder discriminator 22, a memory 23, an audio signal descrambler 24, a video signal descrambler 25, and switches 26, 27 and 28.

At the time of recording, the swtiches 26 and 28 are open and the switch 27 is closed. The input terminal 15 is supplied with the signals $S_1$–$S_6$ successively from the VTR 1 located at the preceeding stage, i.e., before input terminal 15 and the input terminal 16 is supplied with the signals $S_7$, VD and HD. At this juncture, the VTR is placed in the recording mode E—E and the input terminals 15 and 16 are supplied with the signals for the motor drive circuit of the VTR 1.

When the start signal $S_1$ in FIG. 3 is initially detected by the code discriminator 22 from the signals applied to the input terminal 15, the respective circuits are operated in response to its detection. Next, if the key discrimination signal $S_2$ is detected and the kind of key signal $S_5$ of the program is identified, the identification signal $S_8$ is written in the memory 23. The sync separation circuit 20 extracts the signals VD and HD from the scrambled video signal applied to the input terminal 16 and drives the timing circuit 21. When the program ends, the write start signal $S_4$ is detected and the memory 23 is switched to the write-in mode for the key signal $S_5$. The demodulator 19 demodulates the FSK-modulated key signal $S_5$ to obtain a binary code key signal. This key signal is written in the memory 23 in a form corresponding to the identification signal $S_8$ after having been sychronized with the clock pulses through the timing circuit 21. Meanwhile, the signals VD and HD are supplied from the video channel and the write-in clocks are synchronized with VD and HD. Alternatively, it may be changed such that, when the write start signal $S_4$ is detected by the code discriminator 22, the key signal $S_5$ is not recorded on the tape by applying the detected signal to the VTR to stop the operation of the recording circuit. When the writing of the key signal $S_5$ ends, the write stop signal $S_6$ is detected and the writing operation is stopped. As the result, the scrambled video and audio signals and other signals ($S_1$, $S_2$, $S_4$–$S_6$ and so on) are recorded on the tape, and the key signal for the program and the kind of key signal are written in the memory 23. The aforesaid operation is performed every time the scrambled program is recorded, and the key signal for each program and the key discrimination signal are written in the memory 23, respectively.

At the time of playback, the VTR 1 is set to the playback mode, and at the same time, the switches 26 and 28 are closed end of the switch 27 is opened. The input terminal 15 is supplied with the signal obtained by modulating the signal reproduced from the audio track of the desired program recorded in the tape, and the input terminal 16 is supplied with the signal obtained by modulating the signal reproduced from the video track corresponding to the program. First of all, when the reproduced key discrimination signal $S_2$ is detected by the code discrimination 22, the corresponding key signal recorded in the memory 23 is read out. This reading operation continues until the end of reproduction, and the read-out key signal is applied to the descramblers 24 and 25. The descramblers 24 and 25 descramble the scrambled audio and video signals inputted thereto, depending on the code pattern of the key signal. In this case, if the scrambling method is one which utilizes the aforesaid level changes, the degree of amplification for the time interval during which it is kept at its lower level is increased. Whereas, if the scrambling method utilizes a signal order replacement system, the input signal is delayed, and during this delayed period, the signals are arranged or restored to the original order. The audio and video signals restored to the original form by the descramblers 24 and 25 are applied to the receiver through the output terminals 17 and 18. In addition, the start signal $S_1$ or the key discrimination signal $S_2$ may be used for locating the head of the tape at the time of playback by adding the code corresponding to the program thereto. It will be readily understood that the reading of the key discrimination signal from the memory may be made manually.

Other embodiments pertaining to the scrambling method will be hereinafter explained in detail.

When the scrambled signals can be received by an ordinary receiver, the contents thereof should be kept as confidential as possible and the decoding of the key code used for descrambling be made difficult. In the VTR, there are various impediments until the scrambled signals are recorded in the tape through the recording system, since various signal dispositions are required at the time of recording. The deterioration of the picture at the time of recording remains present due to the incompleteness of the descrambling at the time of playback and such incomplete descrambling picture quality. Accordingly, in the system according to the present invention wherein the scrambled broadcasting must be recorded once with a VTR, the scrambled signals desirably pass through the recording system without any problem. The scrambling effect can be made large without disturbing the correlation between the signals, particularly in the case of the VTR for home use, and the descrambling in the decoder can be easily performed. The following portion of the specification discusses various scrambling methods constituted by considering abovementioned points.

As the first step, the scrambling method for the video signal will be explained.

(1) V flicker method

This method is the simplest one, in which the signal level is changed based on one field unit as shown in FIG. 5. In the drawing, the levels in the fourth, seventh and nineth fields are lowered by 2–3 dB. Since the sensitivity of the human eye is particularly high to a plane flicker, high or pronounced scramble effect can be obtained even in the case of slight fluctuation of the intensity. In the example of FIG. 5, a marker signal $S_9$ is inserted every 10th field, and the scrambling is performed by considering 10 fields to be one cycle. According to a typical visual characteristic, human vision is most sensitive to a flicker in a frequency of 10–20 Hz, so that the key code pattern may be determined by regarding this as one cycle. In reality, it may be sufficient to change only the level of Y signal, but it is preferable that the level of the C signal (chroma signal) also be changed at the same ratio since the ratio with the C signal varies temporarily. In this case, the composite signal of Y+C can be scrambled as it is at the broadcasting station side, and overmodulation for only the chroma signal can be avoided. Since the ACC operation by a receiver, in general, is slow and the tracking to the burst signals is not possible, the addition of scramble effect to color flicker may become possible. If the burst signal is made so as to be changed in level, the scrambling process will become simple. Whereas, if the level of the burst signal is assumed to be constant, the process may become rather complex, but it will be easy to obtain a comparatively large amount of level changes. On the other hand, since the VTR is designed so that the high speed response to ACC is possible at the time of playback, recording and playback can be performed without any trouble.

FIG. 6 shows an example of the scrambler for carrying out the aforesaid flicker method.

A set up detection circuit 33, a marker generator 34 and a scramble code generator 35 are operated based on VD and HD signals extracted by the sync separation circuit 32 from the Y+C signal applied to an input terminal 31. When a switch 36 is opened or closed according to the scramble code, the Y+C signal is changed in its level according to the code pattern in synchronism with the field detection by means of the set up detection circuit 33. This scrambled signal is applied to an adder 37 and outputted after having been summed with the output of an adder 38, that is, the summed output of the marker signal and the scrambler code. In this case, the scramble code corresponds to the key signal $S_5$.

(2) Chroma flicker method

In this method, the scrambling to the C signal is performed by changing the phase of the burst signal in field units. Since this method modulates only the phase, there is no adverse effect on the signal-to-noise ratio even if it is passed through the VTR, and no disturbance is introduced into the correlation of the signal. For this reason, a high quality signal can be assured upon descrambling. In addition, the scrambling can be realized without performing the YC separation that may cause a degradation of signal.

Figure 7:
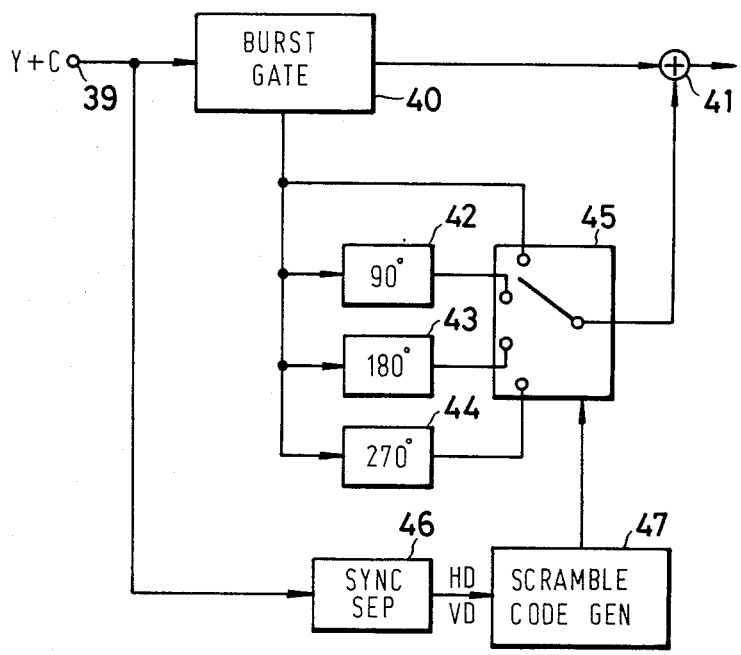
FIG. 7 is a block diagram of another embodiment of a scrambling circuit in accord with the present invention.

FIG. 7 shows another embodiment of a scrambler which performs the aforesaid method.

A burst signal is extracted by a burst gate 40 from the Y+C signal from an input terminal 39 and applied to an adder 41. The extracted burst signal is also phase shifted 90°, 180° and 270° through phase shifter 42, 43 and 44, respectively, and then applied to a switch 45. A scramble code generator 47 is driven by VD and HD signals from a sync separation circuit 46, and the switch 45 is successively switched by the scramble codes from the generator 47. The burst signal, phase shifted from 0° up to 270° successively, is added to the Y+C signal at the adder 41 and then outputted.

When the phase rotation of the burst signal is performed by this circuit for every field, the ACC of the receiver can usually follow every field, so that the hue changes every field. In this example, the scrambling will be performed by randomly changing the chroma flicker of 12 Hz as well as the hue. At the time of recording by means of the VTR, the signal is recorded on the tape as it is since the control system can follow the phase of burst without any delay. Accordingly, the original hue can be obtained by decoding it in the opposite sequence at the time of playback. This method may also be accomplished by switching the combination of at least two phases or of a large number of phases in many different forms. In more concrete form, it may also be accomplished by inserting the marker signal every one set of cycle.

(3) Signal replacement method

In the example of FIG. 8, one period of time represented by 1 H is divided into two parts, and the latter half is shifted to the position corresponding to the former half of the subsequent period of time H. If the signal by this method is received by an ordinary receiver, the picture is reversed right to left as shown in FIG. 9B (the normal picture is shown in FIG. 9A).

FIG. 10 shows one embodiment of the scrambler based on the aforesaid method.

The scrambled signals shown in FIG. 8 are obtained by delaying the input signal through a 0.5H delay circuit 48 constituted by the charge coupled device (CCD) or bucket brigade device (BBD). The CCD is driven by a clock with a frequency n times larger than the HD frequency from a clock generator 49. Two switches 50 and 51 are open for the period of horizontal blanking.

If the normal signal is inserted into the scrambled signal of FIG. 8 in one field unit, the scramble effect improve further and the descrambling is made more difficult. If the insertion process is performed by a key code, the decoding operation will become more difficult. In FIG. 10, this method can be realized by replacing the input signal or a signal obtained by delaying the input signal by 1H with the 0.5H delayed output by means of a switch, and selecting the input signal or the 1H delayed output at the aforesaid insertion point.

Figure 11A:
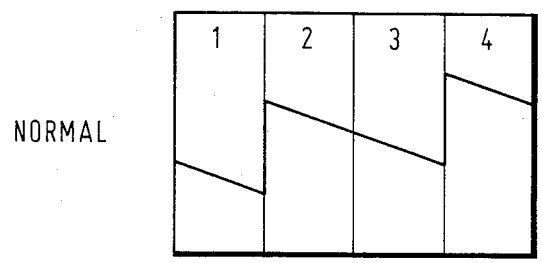
FIGS. 11A and 11B are other schematic representations of a picture on a TV screen in response to an original or normal unscrambled signal and in response to a scrambled signal, respectively.
Figure 11B:
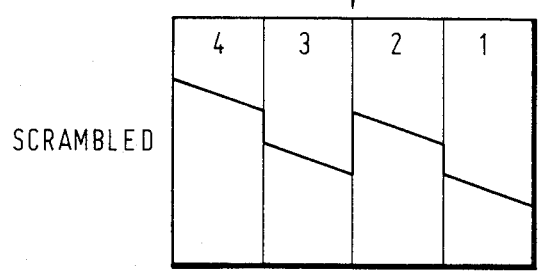

FIG. 11 shows another embodiment wherein the normal screen is divided into four parts so as to be replaced in the desired order. This method can be readily realized by approriately combining a ½ delay circuit and a ¼ delay circuit.

(4) Ghost method

Figure 12:
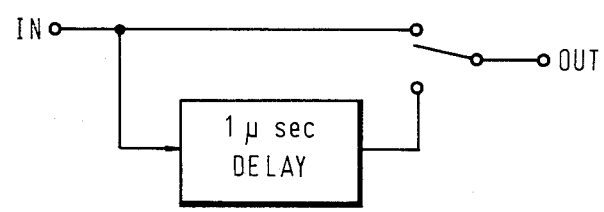

As illustrated in FIG. 12, a pseudo-ghost can be obtained by delaying the input signal by approximately 1 μsec. and changing the switch every field.

(5) Time inversion method

This method is performed by reading, in the direction opposite to the one at the time of writing, a signal written 1H by 1H, from a memory which treats the signal as one field signal unit and then combining the signal with the normal field.

FIG. 13 shows an example of a scrambler for performing the aforesaid method. As seen from the figure, the input signal is first converted to a digital signal in an A/D converter and then alternately written in two 1H period memories through the switch which switches at every 1H. While one memory is into, the other memory is read out. During writing, the up-down counter counts up, whereas at the time of reading, it counts down or reads out in the opposite direction. The read-out signal is taken out through the switch to be switched every 1H and then converted to an analog signal in a D/A converter. The D/A output signal and the original input signal are alternately outputted every one field through the switch which changes position at every field. If the scrambled signals are received by an ordinary receiver, the overlapped picture comprising the normal picture and the reversed picture (from right to left) in reproduced on the screen.

Next, the scrambling method as applied to the audio signal will be explained.

(1) Signal replacement method

As shown in FIG. 14, the replacement of the order of the signal is performed with six fields as one unit. In the an audio signal, it is preferable to have a length of more than six fields (approx. 100 m.sec.), for example, since, if the abovementioned unit is too short, the contents thereof may be discriminated. In this case, a marker signal indicative of the six field unit must be inserted. The marker signal (for example, the marker signal $S_9$ in FIG. 5) used for scrambling the video signal can be utilized as the marker signal for the audio signal.

Figure 15:
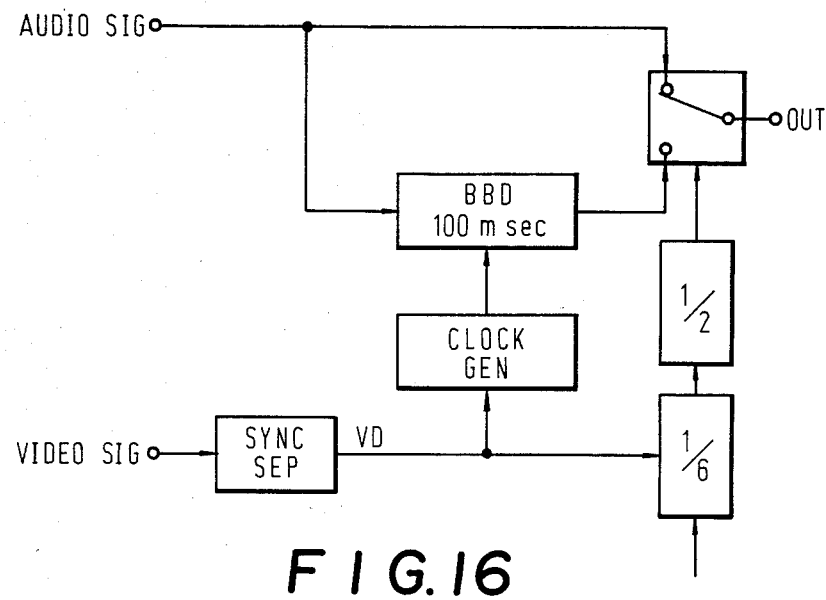
FIG. 15 is a block diagram of the scramble circuit which performs the scrambling operation of FIG. 14.

FIG. 15 shows a scrambler circuit in accord with the method of FIG. 14.

A delay circuit BBD having a delay time of six fields always performs the writing and the reading of the input audio signal in response to a signal synchronized with VD the signal from the video signal. The read-out signal and the original audio signal are alternately selected every 12th field of a switch. Thus, the even numbered signals (corresponding to the second, fourth, sixth—in FIG. 14) can be read out as they are, and the odd numbered signals (corresponding to the first, third, fifth signals—can be read out with an appropriate delay. It is to be appreciated that various forms of order replacement patterns may be used in the methods of FIGS. 14 and 15.

(2) Time inversion method

Figure 16:
FIG. 16 is a graph which is useful for explaining another scrambling operation for the audio signal portions of a television signal.

This method is based on substantially the same process as explained in connection with the scrambling method (5) for the video signal. As illustrated in FIG. 16, the signal is written in the memory in six-field units and then read out in the opposite direction continuously, or in the combination of normal and reverse order according to the desired pattern.

Figure 17:
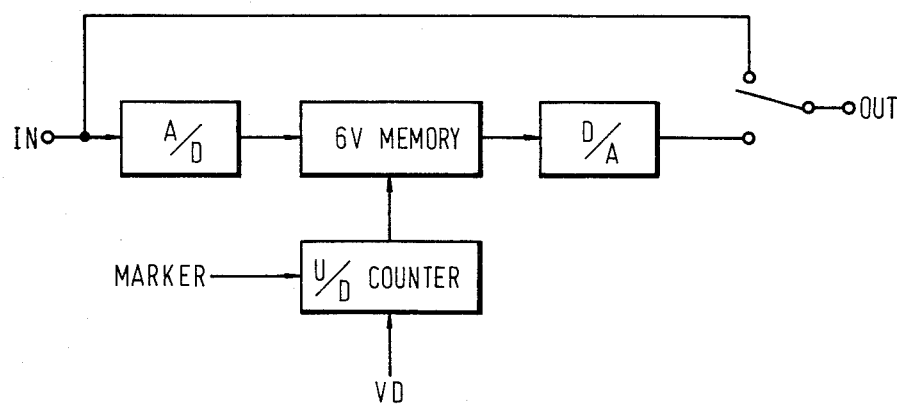
FIG. 17 is a block diagram of the scramble circuit which performs the scrambling operation of FIG. 16.

FIG. 17 shows an embodiment of a scrambler in accordance with this method. In the drawing, a six-field memory performs the writing in the up direction in conjunction an up/down counter and the reading in the down direction. The read-out signal and the original signal are selected by means of a switch and then outputted. This switch is changed over according to the timing described in the scramble pattern in FIG. 16.

As previously described, according to the present invention, since the scrambled program is provided at its end with the key signal used at the time of descrambling, it is impossible to watch the scramble broadcasting in real time. Thus, a recording and playback apparatus such as the VTR with a decoder must be used to view the unscrambled program. As stated above, there is no limitation on the type of VTR. Further, the modification required for the VTR is minimal.

In addition, since the code signal (signal $S_2$) denoting the kind of key signal is added to the start portion of the program, the key signal corresponding to the desired program can be checked prior to its playback.

What is claimed is:

1. A subscription television system requiring time-shifted viewing comprising,
   means for scrambling at least one of a video signal and an audio signal for a specific television program in accordance with a predetermined scrambling mode to produce a scrambled program signal,
   means for generating a control signal in response to said predetermined scrambling mode, said control signal including a key signal for unscrambling said scrambled program signal,
   means for combining said control signal with said scrambled program signal such that said key signal is appended to one of said video and audio signals at the end of said scrambled program signal; and
   means for transmitting said scrambled program signal and said key signal such that said key signal is transmitted after all of said scrambled program signal has been transmitted.

2. A system according to claim 1, in which said means for scrambling includes means for changing said scrambling mode for different television programs.

3. A system according to claim 2, in which said control signal further includes a program code signal for identifying said key signal for said specific television program.

4. The system of claim 1; wherein said means for scrambling includes means for reducing the signal level of said video signal at predetermined intervals.

5. The system of claim 1; wherein said video signal has a burst signal; and wherein said means for scrambling includes means for changing the phase of said burst signal at predetermined intervals.

6. The system of claim 1; wherein said video signal has horizontal intervals; and wherein said means for scrambling includes means for replacing at least one portion of one horizontal interval of said video signal with another portion of said horizontal interval of said video signal.

7. The system of claim 1; wherein said means for scrambling includes means for supplying said video signal and a pseudo-ghost signal corresponding thereto as the video portion of said scrambled program signal.

8. The system of claim 1; wherein said means for scrambling includes means for supplying said video signal with left and right reversed as the video portion of said scrambled program signal.

9. The system of claim 1; wherein said means for scrambling includes means for replacing at least one portion of said audio signal with another portion of said audio signal.

10. The system of claim 1; wherein said means for scrambling includes means for supplying said audio signal and a part of said audio signal in reverse as the audio portion of said scrambled television signal.

11. For use in a time-shift subscription television system, an apparatus for unscrambling television signals transmitted as a scrambled program signal followed by a key signal, said apparatus comprising:
    means for recording said scrambled program signal on a recording medium prior to receiving said key signal;
    memory means for storing said key signal following recording of said scrambled program and for selectively outputting same;
    means for reproducing said scrambled program signal from said recording medium; and
    unscrambler means connected to receive said reproduced scrambled program signal and said key signal output from said memory means for unscrambling said scrambled program signal in accordance with said key signal from said memory means.

12. Apparatus according to claim 11, in which said scrambled program signal comprises a television signal with only a video portion thereof having been scrambled, said video signal being supplied to said recording means to be synchronized with a synchronizing signal included in said video signal which is not scrambled.

13. Apparatus according to claim 5, in which said unscrambling means includes means for indentifying a program code signal, said program code being supplied to said memory means to read out said key signal of said specific program therefrom.

14. The apparatus of claim 11; wherein said recording medium is video tape, and said means for recording and for reproducing includes a video tape recorder.

15. A system for use in time-shifting scrambled video and audio television signals comprising:
    scrambler means for scrambling at least one of said video and audio signals of the television signal to produce a scrambled program signal according to a predetermined scrambling mode;
    means for generating a control signal characteristic of said predetermined scrambling mode for use in unscrambling said scrambled television signal;
    means for appending said control signal to the end of said scrambled program signal
    transmitter means for transmitting said scrambled program signal and said control signal in the sequence with said control signal appended to said scrambled program signal;
    recorder means for recording on a record medium said scrambled program signal transmitted by said transmitter means;
    memory means for storing said control signal transmitted by said transmitter means after said program signal is recorded by said recorder means;
    reproducing means for reproducing said scrambled program signal recorded on said record medium; and
    descrambler means receiving said reproduced program signal and said control signal stored in said memory means for descrambling program signal in accordance with said control signal from said memory means.

16. The system of claim 15; wherein said record medium is video tape; and wherein said recorder means and said reproducing means include a video tape recorder.

17. The system of claim 15; wherein said scrambler means includes means for scrambling both said video signal and said audio signal.

18. The system of claim 15; wherein said scrambler means includes means for changing said scrambling mode.

19. A method for use in a television subscription system comprising the steps of:

scrambling at least one of the video and audio signals of a television signal to produce a scrambled program signal in accordance with a selected scrambling mode;

generating a control signal characteristic of said selected scrambling mode for use in descrambling said scrambled program signal;

appending said control signal to the end of said scrambled program signal;

transmitting first said scrambled program signal followed by said appended control signal;

recording on a record medium said transmitted scrambled program signal;

storing in a memory said transmitted control signal after said program signal is recorded on said record medium;

reproducing said scrambled program signal from said record medium;

reading out said control signal from said memory; and descrambling said scrambled program signal in accordance with said control signal read out from said memory.

* * * * *